125,723

UNITED STATES PATENT OFFICE.

MATTHEW CONNELL, OF JERSEY CITY, NEW JERSEY.

IMPROVEMENT IN MEDICAL COMPOUNDS OR COUGH-MIXTURES.

Specification forming part of Letters Patent No. 125,723, dated April 16, 1872.

Specification describing a new and useful Improvement in Cough Compound, invented by MATTHEW CONNELL, of Jersey City, in the county of Hudson and State of New Jersey.

This invention relates to a new and useful improvement in a remedy for coughs, colds, and kindred diseases; and consists in a combination of ingredients solidified as sugar candy, in the form of tablets, or in any other form convenient for use.

My compound consists of sugar, phosphate of soda, oil of peppermint, and water, combined substantially as hereinafter described.

In carrying out my invention I reduce six drams of sugar (with the addition of one dram of water) to a semi-fluid state, and then add one dram of phosphate of soda and one drop of the oil of peppermint. This forms a sufficient quantity of the composition for one tablet; but the quantities named are given simply to govern the proportions of the ingredients in making a larger quantity.

For convenience in sale and use I pour the semi-fluid, after the combination has been made, into molds, where it solidifies, thereby forming cakes or tablets of about two inches diameter and one-fourth (more or less) inch in thickness.

I do not confine myself to the precise proportions named, nor to any particular size or form of tablet or cake.

Having thus described my invention, I claim as new and desire to secure by Letters Patent—

The above-described cough compound, substantially as specified.

MATTHEW CONNELL.

Witnesses:
GEO. W. MABEE,
T. B. MOSHER.